(12) United States Patent
Catteau et al.

(10) Patent No.: US 6,777,106 B2
(45) Date of Patent: Aug. 17, 2004

(54) METAL BLOCKS SUITABLE FOR MACHINING APPLICATIONS

(75) Inventors: Frédéric Catteau, Issoire (FR); David Godard, Montreuil-Juigne (FR)

(73) Assignee: Pechiney Rhenalu, Paris (FR)

( * ) Notice: Subject to any disclaimer, the term of this patent is extended or adjusted under 35 U.S.C. 154(b) by 0 days.

(21) Appl. No.: 10/128,527

(22) Filed: Apr. 24, 2002

(65) Prior Publication Data

US 2003/0003281 A1 Jan. 2, 2003

(30) Foreign Application Priority Data

Apr. 24, 2001 (FR) .............................................. 01 05500

(51) Int. Cl.⁷ .......................... B32B 15/01; B32B 31/04
(52) U.S. Cl. ........................ 428/615; 148/516; 148/527; 148/529; 148/535; 148/536; 428/577; 428/588; 428/594; 428/636; 428/637; 428/638; 428/926; 428/940
(58) Field of Search ................................. 428/615, 577, 428/588, 594, 636, 637, 638, 926, 940; 148/516, 527, 529, 535, 536

(56) References Cited

U.S. PATENT DOCUMENTS

| | | |
|---|---|---|
| 3,024,526 A | 3/1962 | Philipchuk et al. |
| 3,093,459 A | 6/1963 | Siebel et al. |
| 3,865,560 A | 2/1975 | Sabetay |
| 3,878,871 A | 4/1975 | Anthony et al. |
| 4,917,969 A | 4/1990 | Pircher et al. |
| 5,277,719 A | 1/1994 | Kuhlman et al. |
| 5,785,924 A | 7/1998 | Beguinot et al. |
| 6,077,363 A | 6/2000 | Heymes et al. |

FOREIGN PATENT DOCUMENTS

| | | |
|---|---|---|
| DD | 244360 A1 | 4/1987 |
| EP | 0117 671 B1 | 7/1987 |
| EP | 0 723 033 A1 | 7/1996 |
| EP | 0989 195 A1 | 3/2000 |
| EP | 0 997 253 A1 | 5/2000 |
| FR | 1381594 | 11/1964 |
| FR | 1397963 | 5/1965 |
| FR | 1458506 | 10/1966 |
| GB | 1042952 | 9/1966 |
| GB | 1248794 | 10/1971 |

OTHER PUBLICATIONS

Nobelclad CD–ROM; Certified Member IEMA; Group SNPE; "Metal Blocks Suitable for Machining Applications" (no date given).

*Primary Examiner*—Robert R. Koehler
(74) *Attorney, Agent, or Firm*—Connolly Bove Lodge & Hutz LLP

(57) ABSTRACT

The present invention is directed to a metal block suitable for machining, the metal block comprising at least two superimposed metal plates, each having a thickness of at least 12.5 mm, wherein the yield strength of the block is at least 75% of the yield strength of the initial metal plate(s). The present invention is further directed to methods for manufacturing such blocks from two or more thick metal plates by explosive welding and other methods. Blocks according to the present invention are useful, for example, for manufacturing aircraft structural components or injection molds for plastics or rubber.

23 Claims, No Drawings

METAL BLOCKS SUITABLE FOR MACHINING APPLICATIONS

CLAIM FOR PRIORITY

This application claims priority under 35 U.S.C. §119 to French Patent Application No. 0105500, filed Apr. 24, 2001 which is incorporated herein by reference in its entirety.

BACKGROUND OF THE INVENTION

1. Field of the Invention

The present invention relates to metal blocks suitable for use in machining applications, for example for manufacturing large size toolings or molds, or structural components for high capacity aircraft.

2. Description of Related Art

Metal blocks used for machining large size parts are generally rolled metal plates or forged blocks. When manufacturing such thick metal plates, and especially thick plates in aluminum alloys, static mechanical properties in the centre of such plates are usually lower than those same properties in the centre of thinner metal plates or sheets. More specifically, the tensile strength ($R_m$) the yield strength ($R_{p0.2}$) and the ultimate elongation (A) tend to decrease (often to unsatisfactory levels) when the thickness of the metal sheet or plate is increased by virtue of a given manufacturing process. As an example, the European standard EN 485-2 as of November 1994 specifies for rolled plates in EN AW-6061 aluminum alloy in the metallurgical condition T651, the following minimum values: $R_m$min=290 MPa for plates with a thickness between 12.5 mm and 100 mm and a $R_m$min=265 MPa for plates with a thickness between 150 mm and 175 mm. For ultimate elongation properties, the reduction is even more significant: the guaranteed minimum value is 8% for plates with a thickness between 12.5 mm and 40 mm, and 4% for plates with a thickness between 150 mm and 175 mm. According to the EN 485-1 standard, for plates with a thickness of more than 40 mm, the longitudinal axis of the specimen should be located at a distance from one of the rolling surfaces equal to a quarter of the thickness, and for plates with a thickness of less than 40 mm, to half the thickness.

This drop in the static mechanical properties is more significant or marked when the mechanical properties are analyzed at various levels below the rolled surface. For example in the case of a metal plate with a thickness of 200 mm, by taking out a specimen at 25 mm, 50 mm and 100 mm from below the surface, it can be seen that the properties drop off accordingly. This phenomenon is well known to one skilled in the art and its causes are multiple. Work-hardening of the metal plate during the rolling process may increase its $R_m$ and $R_{p0.2}$ values, but is limited by the design of the hot rolling mill. In order to obtain a metal plate with a final thickness of 100 mm by a rolling process which is to include a reduction of the thickness by half, it is generally necessary to start from a rolling ingot with a thickness of at least 200 mm. In order to obtain in the same way a metal plate with a final thickness of 400 mm, it is necessary to start with a rolling ingot with a thickness of at least 800 mm. However, currently no rolling mill for rolling such a thick ingot or plate is available. Thick plates or inglos may be work-hardened by forging, but for this, very powerful forging presses must be available, which only exist in rare locations, and such methods are very expensive.

In the case of thick metal plates of quench hardenable alloys, the quench rate influences the static mechanical properties. The local quench rate for a given volume of the metal plate is determined by the thermal conductivity of the material and therefore depends on the thickness of the metal plate, or, more precisely, on the distance of the particular volume element from the surface in contact with the quenching medium.

In the case of quenched metal plates, the quenching process induces residual stresses, which may lead to deformation of the metal plate, notably when the plate is machined. These stresses are therefore undesirable and should be minimized, for example, by stretching the quenched metal plate. Stretching machines available in most factories often do not accept metal plates with thicknesses of more than 100–200 millimeters, and their power is also often limited. Relief of internal stresses in metal plates may also be obtained by compressing such metal plates under a forging press. In this case, the thickness of the metal plate may be larger, but then the maximum compression stress that the forging press is able to provide becomes a factor of limitation.

The drop in the local static mechanical properties versus thickness is generally undesirable. That is, when machined parts are manufactured from thick metal plates, it is the local mechanical properties near the new surface generated by the machining process that determine the properties of the machined part. For example, when an injection mold for plastic parts is manufactured by machining a thick steel or aluminum alloy block, the designer of the mold must take into account the gradient of the static mechanical properties based on the thickness of the metal block, as opposed to the overall mechanical properties of the block. Namely, because the block will be shaped and machined, it is the static property values below the outer surface that become important and any decrease in the properties at certain depths below the surface must be taken into account.

Another drawback of prior art products relates to the machining operation itself. As an example, when thick metal plates in aluminum alloys are machined to a great depth, it is observed that the machinability of the metal is reduced upon penetrating into the inside of the plate, as the metal is softer deep down as opposed to metal that is close to the plate's original outer surface. Also, polishing of machined surfaces and chemical or electrolytic graining are of a poorer quality for deeply machined surfaces than surfaces obtained from an area near the original outer surface of the thick plate. This is because precipitate formation in the centre of thick aluminum plates and precipitate formation close to the surface are not necessarily the same.

To overcome these drawbacks, one skilled in the art has hitherto favored a metallurgical approach by working either on the composition of the alloy used, or on the manufacturing route. This is notably the case for aluminum alloys. For example, in U.S. Pat. No. 6,077,363 (incorporated herein by reference), residual stresses of a AlCuMg alloy metal sheet are minimized by selecting an optimized chemical composition, notably with regards to manganese, iron and silicon, and by selecting a manufacturing process comprising several thermomechanical processing steps.

U.S. Pat. No. 5,277,719 (Aluminum Company of America) (incorporated herein by reference) presents a method for manufacturing a thick low porosity plate in an aluminum alloy from the 7xxx series, by employing a first preforging step with a reduction ratio of at least 30%, which precedes the hot rolling. Patent application EP 723 033 A1 (Hoogovens Aluminum Walzprodukte) (incorporated herein by reference) describes a method for manufacturing a thick metal plate in an aluminum alloy, by conducting one or several forging steps after a first hot rolling step. The goal of these methods is mainly to improve fatigue strength. However the method described in EP 723 033 also leads to a slight reduction in the drop of the tensile strength for metal plates with a thickness of more than 8 inches (about 205 mm).

Patent application EP 989 195 (Alusuisse Technology & Management AG) (incorporated herein by reference) provides a method for reducing residual stresses in AlCuMg alloy sheets, aimed at obtaining homogeneous precipitation of submicron phases of $Al_3Zr$ in the thickness of the metal sheet. These metal sheets may be obtained by hot rolling a rolling ingot, or they can be directly manufactured from cast plates, without any rolling.

These different means provided by the state of the art induce constraints in terms of: (i) the selection of the alloys, (ii) the metallurgical conditions, and (iii) the manufacturing method for the metal plate and of its thickness. Moreover, they are not entirely satisfactory. For example, no acceptable method exists for manufacturing a thick aluminum metal plate, notably with a thickness larger than 200 mm, made in heat-treatable alloys, for which local $R_m$, $R_{p0.2}$ and values do not decrease significantly upon advancing from the surface to the half thickness. The availability of such a product would enable lighter tools to be manufactured in many fields of industry. If such a product could be produced that would be available in a larger thickness than the metal plates according to the prior art, parts of a larger size could be manufactured, such as molds or toolings, and the polishing and graining properties over their entire thickness would be improved.

SUMMARY OF THE INVENTION

An object of the present invention was therefore to provide a thick metal product (i.e. a block with a thickness of more than 25 mm, for example with a thickness of more than 200 mm, more than 400 mm or even more than 600 mm), exhibiting acceptable mechanical characteristics throughout its entire thickness, and also exhibiting a relatively low level of residual stresses.

In accordance with these and other objects, there is provided a metal block suitable for use in machining applications. The metal block comprises at least two superimposed metal plates, each having a thickness of at least 12.5 mm, and each having an initial yield strength in a specified direction measured at quarter thickness. The plates may be the same or different from each other, and are typically selected from alloys of the same alloy group (i.e. 5xxx series, etc). The yield strength of the metal block, measured on a specimen thereof taken from a location of the block that does not include a bonding zone between the metal plates, is at least 75% of the yield strength of the individual metal plate having the lowest initial yield strength in the same specified direction.

In further accordance with the present invention, there is provided a metal block suitable for use in machining applications, comprising at least two superimposed metal plates, each having a thickness of at least 12.5 mm, which may be the same or different from each other. The metal plates can be selected from the group consisting of alloys of the same alloy group, wherein the yield strength at any given point in a specified direction does not vary by more than plus or minus 15% of the average value.

In further accordance with the present invention, there is provided a metal block suitable for use in machining applications. The metal block comprises at least two superimposed metal plates, each having a thickness of at least 12.5 mm, and each having an initial yield strength in a specified direction measured at quarter thickness. The plates may be the same or different from each other, and are alloys of the same alloy group, wherein the yield strength in a specified direction at any point of the block is at least 75% of the yield strength of the metal plate having the lowest initial yield strength in the specified direction.

In yet further accordance with the present invention, there is provided a method for manufacturing metal blocks, comprising superposing at least two metal plates of essentially the same length and width with a constant gap therebetween to form an assembly, providing a boundary around the lateral sides of the assembly, covering an upper face of the uppermost metal sheet with an explosive over the entirety of the upper surface, and detonating the explosive in order to effectuate bonding between or among the plates.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

The metal blocks according to the invention may be obtained from plates of different metals and alloys used for machining large size parts, notably steels, copper alloys and aluminum alloys. It is advantageous to use quench-hardenable alloys that lead to high mechanical strength in the quenched condition. Thus, structurally hardened aluminum alloys of the 2xxx, 6xxx and 7xxx group are preferably used in the T3 condition (quenched, aged) or T6 (quenched, tempered). Aluminum alloy groups and alloy compositions of wrought aluminum alloys are defined in the Registration Records of The Aluminum Association and in the standards EN 573, temper designations are defined in the standard EN 515, these documents being known to a person skilled in the art and are incorporated herein by reference in their entireties.

Regardless of the method used for assembling, the metal plates should be as flat or planar as possible and also possess a relatively low level of residual stresses, and these initial conditions may be obtained by any known method such as by stretching the plates between the jaws of a stretching machine, or by compressing the plates with a forging press. The surface condition of said plates can be adapted to the method used for assembly if desired for any reason, as will be explained below. The thickness of each of the superimposed metal plates in most cases should be at least 12.5 mm. The thickness of each plate can be the same or different. Preferably, the total thickness of the superimposed metal plates is at least 25 mm, and most preferably at least 40 mm.

Assembly of the thick metal plates together may be carried out by any known method with which a mechanical strength of the assembled block may be obtained that is sufficient for the intended use of the assembled block. According to the invention, it is possible to manufacture blocks by superimposing at least two metal plates, each having a thickness of at least 12.5 mm, and each having an initial yield strength in a specified direction measured at quarter thickness, which may be the same or different from each other. The metal plates are preferably selected from alloys of the same alloy "group" (i.e. in the case of aluminum, 2xxx series, 7xxx series, etc.), and the yield strength in the specified direction at any point of the block formed by the superposed plates is at least equal to 75%, and preferably at least 85% or still more preferably at least 90% of the yield strength of the metal plate that had the lowest initial yield strength in the specified direction being evaluated.

In a preferred embodiment, the method of assembling the block is chosen such that the mechanical resistance throughout the block is close to the mechanical resistance of the initial metal plates, even within the bonding zone. The bonding zone as used herein refers to those areas of the assembled block where the individual plates that form the block meet and bond together.

Moreover, the bond between the plates should exhibit acceptable mechanical and thermal stability as well as the other characteristics, such as the thermal conductivity of the joint between the metal plates or the surface appearance, that are required for the targeted final application of the assembled block. Such mechanical and thermal properties required for various intended end uses in tooling and mold applications are well known to those skilled in the art.

According to the invention, it is possible to manufacture thick metal blocks (i.e. at least 25 mm) with mechanical properties that are not affected in a measurable way by the total thickness of the block. More specifically, the yield strength, the tensile strength and the ultimate elongation, i.e. the so-called static mechanical properties, exhibit a significantly lower variation throughout the thickness of the block than in blocks manufactured according to prior art processes.

In a preferred embodiment, it is possible to obtain a thick metal block by assembling at least two superimposed metal plates of the same alloy group, each having a thickness of at least 12.5 mm. The yield strength of the assembled metal block, measured on a specimen thereof across a bonding zone between the metal plates in a specified direction, is at least 75%, preferentially at least 80% and most preferentially at least 90% of the yield strength of the metal plate(s) that possesses the lowest initial yield strength in the same specified direction.

In another embodiment of the invention, the bonding zone between superimposed metal plates exhibits good mechanical and thermal stability. In addition, other characteristics, such as the thermal conductivity of the joint between the two metal plates and/or the surface appearance of the joint or bond are satisfactory in terms of the requirements for the targeted final application of the assembled block. That is, many applications of the assembled block require that the joint not be visually apparent to any degree. Also, some applications require a certain heat resistance in terms of temperature maximums and times of exposure to high temperatures. It is thus possible to obtain a block wherein the local yield strength $R_{p0.2}$ of the block, measured in the short transverse direction across a bonding zone, is at least 75%, preferentially at least 80% and most preferentially at least 90% of the $R_{p0.2}$ of the metal plate(s) that possesses the lowest initial yield strength in the same short transverse direction.

Thus, the thick metal plates may be assembled through bonding by any known mechanism such as by adhesive films, plastic sheets or liquid adhesives. For instance, a thin adhesive, hot polymerizable film may be applied and polymerization may be carried out (for example, when the alloy is a structurally hardened alloy), during tempering of the metal plates. A one or two component liquid adhesive may also be applied on the surface of one or both of the metal plates to be assembled, and hardening of the adhesive may be obtained either by leaving the assembled block at rest, at room temperature for sufficient time, or by heating at a sufficient temperature for a certain time. A polymerizable plastic sheet inserted between two thick metal sheets may also be used and would be suitably heated to effectuate polymerisation, and hence, bonding. In all these cases, two or more metal plates may be assembled together at one time, and the adhesive may be left to polymerize or harden while the assembly is laid down flat, either under the metal plate's own weight, or by exerting pressure on the bonded joints. An advantage of adhesive bonding is its low cost, and a disadvantage is that the bonding may be rather weak. In any case, an appropriate pretreatment (for instance by sulfochromic etching or sandblasting) of the surfaces is often desirable or necessary prior to application of the adhesive.

Another assembly method which may be used is the hot deformation of two or more superimposed thick metal plates, for example by rolling or forging. This is the same type of metallurgical bonding that is obtained in the known method for plating metal sheets. This method may advantageously be used for assembling thick metal sheets or metal plates in aluminum alloys without any heat treatment, such as the 5xxx series alloys. It is less suitable for structurally hardened alloys, which generally require preheating of the metal plates, which could potentially change the metallurgical condition of the plates in an undesirable way. The use of this method may be limited by the capacity of the rolling mills or forging presses for accepting very thick metal plates, or by the maximum stress, which the rolling mill or forging press being utilized can provide.

The metal plates may also be assembled by welding, notably by electron beam welding, a method which does not significantly deteriorate the mechanical characteristics of the plates. However, electron beam welding may not be suitable for plates of large size.

Another advantageous assembly method preferably used in connection with the present invention is explosive welding. Explosive welding has been known for many years, and is mostly used for plating thin metal sheets on thick metal sheets of a different metal, notably for obtaining a noble metal layer on a thick metal sheet in ordinary steel. French Patents FR 1381594, FR 1397963 and FR 1458506 from Asahi Kasei (all of which are incorporated herein by reference in their entireties) illustrate this technology. Most of the numerous examples described in these patents relate to plating of a thin metal sheet on a steel metal sheet, and some of them describe the assembly of two thin metal sheets, with a thickness of the order of 1 mm, made of the same metal (stainless steel or aluminum). Also, U.S. Pat. No. 3,024,526 (Atlantic Richfield Corporation) ["the '526 patent"] (the content of which is incorporated herein by reference) describes the explosive welding of two aluminum sheets with a thickness of 0.062 inches (i.e. about 1.6 mm). The method of the '526 patent does not describe explosive welding used for forming thick blocks made up or two or more thick metal plates of a same metal, in particular in aluminum alloys.

According to the present invention, the metal block comprises at least two superimposed metal plates, each having a thickness of at least 12.5, mm, preferably at least 25 mm and most preferably at least 40 mm. However, if the individual plates are very thick, they may exhibit a gradient of static mechanical properties as a function distance from a rolling surface.

In a preferred embodiment, the plates to be assembled are of the same base metal and, in a case where this concept exists for a given base metal, of the same alloy group. The term "base metal" means here for instance aluminum, steel, copper, brass or the like. The terms "alloy group" and "alloy" are defined for aluminum alloys according to the abovementioned standard EN 573 and the Registration Record of The Aluminum Association, the contents of which are incorporated herein by reference. According to these documents, aluminum alloys are subdivided into groups according to the major alloying element: 1xxx (minimum 99.00 aluminum), 2xxx (Al—Cu), 3xxx (Al—Mn), 4xxx (Al—Si), 5xxx (Al—Mg), 6xxx (Al—Mg—Si), 7xxx (Al—Zn), 8xxx (other alloying elements). The present invention is of special interest for those base metals, alloy groups and alloys that cannot be manufactured in very high thickness, due to technical limitations or economic reasons, or which exhibit, when manufactured as a thick plate, a strong variation of static mechanical properties throughout the thickness. This is especially the case for heat-treatable aluminum alloys belonging to the groups 2xxx, 6xxx and 7xxx.

In a specific embodiment of the invention, the thick metal plates (at least 12.5 mm) to be assembled comprise the same alloy and in the same metallurgical condition, i.e. produced according to a similar manufacturing route, in order to obtain homogeneous properties.

The metal plates may be of the same thickness or of a different thickness, and two metal plates or several metal plates may be assembled in one or more operations. The assembly method by explosion welding can be conducted in any desirable way, such as that described in the aforementioned French patents and the '526 patent. An acceptable and advantageous explosive welding method of the present invention comprises: (i) preparing the surface of the metal plates by brushing or grinding and careful cleaning to the extent necessary, (ii) superimposing the metal sheets of essentially the same format (i.e. length and width), by providing a gap between them using an insert provided therebetween (insertable parts), (iii) closing the interstice(s) between the metal plate, for example using adhesive tape, (iv) placing an explosive, for example a powder, over the entire surface of the uppermost metal plate, and (v) finally proceeding with the detonation of this explosive, in order to obtain a weld of the metal plates over the entireties of their surfaces.

In a preferred embodiment, which is based on the use of explosive welding, plates with a elongation at rupture A in the longitudinal direction of more than 13%, and preferentially more than 15%, and with a Charpy impact energy of at least 30 Joules are used.

The method according to the invention allows blocks to be manufactured, wherein the thickness of the blocks is not limited by the capacity of the tools used for manufacturing the metal plates (rolling mills or forging presses). The thickness of the blocks is preferentially at least 200 mm, more preferentially at least 400 mm, and most preferentially at least 600 mm. With these blocks, it is possible to easily produce machined parts with very large dimensions, such as those that can be used as structural components of large capacity aircraft, structurally hardened aluminum alloys, toolings or injection molds for plastics in steel, and/or for copper and aluminium alloys.

The manufacture of these machined parts may involve one or more processes such as turning, milling, drilling, boring, tapping, spark machining, rectification, polishing and the like as commonly employed in the art. In certain cases, it is also possible to deposit on at least part of the thereby generated surface, a layer of hard metal, by any known method such as the one described in Patent Application EP 997 253 A1 (Werkzeugbau Leiss Gmb) (incorporated herein by reference), or by providing a ceramic coating by a known process, such as Physical Vapor Deposition. The applicant has discovered that such a metal coating is particularly useful in the case of blocks assembled through adhesive bonding, when the deep machining has crossed the bonded joints. A layer of aluminum or of another metal may thus be deposited if desired for any reason.

For manufacturing blocks in structurally hardened aluminum alloy, the applicant has found a manufacturing method that gives especially good results. Namely, the thick metal plates are provided in a stress relieved condition, for example in the T351 condition (designation according to the EN 515 standard), and assembled by explosion. Then the thick block is submitted to a tempering treatment. With the use of thick stress relieved metal plates (i.e., at least 12.5 mm), blocks with a very low level of residual stresses may be obtained, which are particularly well suited to machining. Moreover, it is observed that metal sheets in the T351 condition exhibit better ductility than other comparable sheets or plates, and this increase in ductility minimizes or even prevents accidental failure during their assembling or handling.

The thick blocks in structurally hardened aluminum alloys according to the present invention can be used for the manufacture (by machining) of injection molds for plastic or rubber parts. They can also be used for the manufacture (especially by machining) of structural elements of aircrafts, especially of high capacity aircrafts. Alloys such as AA7040 or AA7075 are especially suitable for this latter application.

EXAMPLES

Example 1

Prior Art

Thick metal sheets in 7449 aluminum alloy were manufactured in the T651 condition according to techniques known to one skilled in the art. The thickness of these metal sheets was between 50 mm and 150 mm. The yield strength $R_{p0.2}$ was measured in the TL direction at a quarter thickness. The results are summarized in Table 1. A very strong decrease of $R_{p0.2}$ is observed when the thickness e of the metal sheet increases.

TABLE 1

| e(mm) | 50 | 75 | 100 | 150 |
|---|---|---|---|---|
| $R_{p0.2}$(MPa) | 584 | 575 | 564 | 508 |

Example 2

Invention

Two 7075 aluminum alloy metal plates were prepared with the same format (i.e. length and width) and with thicknesses of 25 and 70 mm, respectively. The composition of the alloy was the following (weight %): Si=0.08 Fe=0.15 Cu=1.56 Mn=0.03 Mg=2.30 Cr=0.19 Zn=5.92 Ti=0.03

These metal plates were solution heat treated at a temperature of 465° C., then quenched in cold water, naturally aged and stretched to a permanent set of 1.5%, which corresponds to a T351 condition. The metal plates were then assembled by explosion welding on the site of NobelClad Europe at Rivesaltes (France). The explosion welded block was then submitted to tempering for 48 h at 120° C. in order to bring it into the T651 condition. Examination of the bonding zone does not reveal any visible interface in the raw polished condition. After chromic etching, the interface between the initial metal plates becomes visible, with an area of 0.3 mm on both sides of the weld including inclined slip bands orientated in the direction of the shock wave propagation, which shows significant work hardening.

Cylindrical tensile test specimens were taken at quarter thickness from the 70 mm metal plate and from the interface zone between the two metal plates, and the static mechanical characteristics were measured: ultimate strength $R_m$ (MPa), yield strength $R_{p0.2}$ (MPa) and ultimate elongation A (%), in the L, TL and TC directions. The results are shown in Table 2:

TABLE 2

| Specimen | Direction | $R_{p0.2}$(MPa) | $R_m$(MPa) | A (%) |
|---|---|---|---|---|
| Metal plate | L | 464 | 528 | 13.3 |
| Interface | L | 501 | 553 | 11.6 |
| Metal plate | TL | 450 | 548 | 10.3 |
| Interface | TL | 495 | 555 | 8.7 |
| Metal plate | TC | 456 | 532 | 5.5 |
| Interface | TC | 478 | 540 | 4.5 |

It is seen that the ultimate strength and the yield strength, regardless of the direction of the measurement, are increased in the bonding zone as compared to the values for the initial metal sheets, with a slightly reduced elongation.

The cyclic fatigue lifetime was also measured under a stress of 200 MPa, at a frequency of 50 Hz, with R=0.1, on smooth round specimens in the TC direction, with a stress concentration factor $K_t$=1, according to the ASTM E466 standard, one taken in the 70 mm metal plate, the other one in the bonding zone between the two metal plates. The number of cycles until failure was 206375 and 321271, respectively, which shows an improvement of the fatigue strength in the bonding zone.

Example 3

Blocks have been manufactured by bonding of two plates in aluminum alloy AA7449, the bonding surfaces of which were pretreated either by sandblasting or by sulfochromic etching. A liquid epoxy adhesive (reference AV 119) or an epoxy film (reference AF 163-2L.03) were used. Tensile testing across the bonding zone was performed on specimens of the size 200 mm×29 mm×17 mm. (bonded surface 493 mm$^2$). Results are shown in Table 3. It can be seen that sulfochromic etching gives a higher bonding force.

TABLE 3

| Adhesive | Bonding strength (pretreatment: sulfochromic etching) | Bonding strength (pretreatment: Sandblasting) |
|---|---|---|
| AV 119 | 75.8 ± 5.7 MPa(AR) | 43.9 ± 10.5 MPa(AR) |
| AF 163-2L.03 | 46.0 ± 0.5 MPa(CR) | 41.2 ± 2.3 MPa(CR) |

AR: adhesive rupture
CR: cohesive rupture

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document, French Patent Application No. 0105500, filed Apr. 24, 2001 and its corresponding PCT application filed Apr. 24, 2002, are incorporated herein by reference in their entireties.

As used herein and in the following claims, articles such as "the", "a" and "an" can connote the singular or plural.

All documents referred to herein are specifically incorporated herein by reference in their entireties.

We claim:

1. A metal block suitable for use in machining applications, comprising:
    at least two superimposed metal plates, each having a thickness of at least 12.5 mm, and each having an initial yield strength in a specified direction measured at quarter thickness, which may be the same or different from each other, said metal plates being selected from the group consisting of alloys of the same alloy group, wherein the yield strength in the specified direction at any point of the block is at least equal to 75% of that of the metal plate having the lowest initial yield strength in said specified direction.

2. A metal block suitable for use in machining applications, comprising:
    at least two superimposed metal plates, each having a thickness of at least 12.5 mm, and each having an initial yield strength in a specified direction measured at quarter thickness, which may be the same or different from each other, said metal plates being selected from the group consisting of alloys of the same alloy group, wherein the yield strength of said metal block, measured on a specimen thereof which is obtained from any part of said block that does not include a bonding zone between said metal plates, is at least equal to 75% of that of the metal plate having the lowest initial yield strength in said specified direction.

3. A metal block suitable for use in machining applications, comprising:
    at least two superimposed metal plates, each having a thickness of at least 12.5 mm, which may be the same or different from each other, said metal plates being selected from the group consisting of alloys of the same alloy group, wherein the yield strength at any given point in a specified direction does not vary by more than plus or minus 15% of the average value.

4. A metal block according to claim 1, wherein the total thickness of said block is at least 200 mm.

5. A metal block according to claim 1, wherein the total thickness of said block is at least 400 mm.

6. A metal block according to claim 1, wherein the total thickness of said block is at least 600 mm.

7. A metal block according to claim 1, wherein the thickness of each of the superimposed metal plates is at least 25 mm.

8. A metal block according to claim 1, wherein said metal plates comprise the same or different aluminum alloy.

9. A metal block according to claim 7, wherein said aluminum alloys are structurally hardened aluminum alloys.

10. A metal block according to claim 8, wherein said metal plates are in a quenched condition.

11. A metal block according to claim 8, wherein said metal plates are in a quenched and aged condition.

12. A metal block according to claim 9, wherein said metal plates have been stress relieved by controlled traction or compression.

13. A metal block according to claim 1, wherein said yield strength in the specified direction at any point of the block is at least equal to 85% of that of the metal plate having the lowest initial yield strength in said specified direction.

14. A metal block according to claim 1, wherein said metal plates are adhesively bonded to each other.

15. A metal block according to claim 1, wherein said metal plates are bonded by rolling or forging.

16. A metal block according to claim 1, wherein said metal plates are welded together with an electron beam.

17. A metal block according to claim 1, wherein said metal plates arc welded together by explosive welding.

18. A method for manufacturing a block according to claim 1, comprising:

superposing said metal plates of essentially the same length and width with a constant gap therebetween to form an assembly, providing a boundary around all the lateral sides of said assembly, covering the upper face of the upper metal plate with an explosive over the whole of said upper surface, and detonating said explosive.

19. A method according to claim 18, wherein said metal plates are structurally hardened aluminum alloys.

20. A method according to claim 19, wherein said metal plates are in a quenched condition.

21. A method for manufacturing aircraft structural components comprising:

providing a block according to claim 1, and machining said block to form an aircraft structural component.

22. A method for manufacturing injection molds for plastics or rubber, comprising:

providing a block according to claim 1, and machining said block to form an injection mold.

23. A method for manufacturing machined parts, comprising:

providing a block according to claim 1, and machining said block to form a machined part.

* * * * *